March 10, 1964 G. J. TRAPP 3,124,661

SCANNER

Filed March 16, 1960 2 Sheets-Sheet 1

Inventor
G. J. Trapp
By Glascock Downing & Seebold
Attys.

SCANNER

Filed March 16, 1960

Inventor
G. J. Trapp
By Glascock Downing & Seebold
Attys.

United States Patent Office 3,124,661
Patented Mar. 10, 1964

3,124,661

SCANNER

George Joseph Trapp, 105 Aylward Road, Merton Park, London SW. 20, England

Filed Mar. 16, 1960, Ser. No. 15,436
Claims priority, application Great Britain Feb. 17, 1960
11 Claims. (Cl. 179—100.2)

This invention relates to a scanner for magnetic tape and more particularly to an arrangement for recording signals of very high frequency on magnetic tape.

In magnetic tape recording the speed at which the tape must be moved past the magnetic recording or reproducing head is dependent, among other things, upon the width of the recording gap and the highest frequency which it is desired to record. It has been suggested that at the present stage of development the maximum recording density which can be achieved is 20,000 cycles per inch of tape; that is to say, if it is desired to record signals having a maximum frequency of 20 kc./s., then a tape speed of one inch per second is sufficient and if it is desired to record signals having a maximum frequency of 1 mc./s. then a minimum tape speed of 50 inches per second is required. To achieve such results requires a magnetic head made to an extreme standard of precision, with a minute recording gap in its magnetic circuit.

For the recording of signals of very high frequency, for example, television signals, it is desirable to be able to record signals having frequencies up to about 3 mc./s. for a 405 line system, as is standard in the United Kingdom, and up to about 4.5 to 5 mc./s. for a 625 line system such as is commonly used in the United States and on the Continent. At the recording density mentioned these frequencies require minimum tape speeds respectively of 150 inches per second and 250 inches per second and when using the conventional method of traversing tape lengthwise past a stationary magnetic head a great length of tape is necessary to make a recording of reasonable duration at such speeds. Attempts have therefore been made to device methods for reducing the length of tape which is required for a given recording. In one known method the tape is formed transversely into an arc and is traversed past a recording head rotating about an axis parallel to the line of the tape having four recording elements equally spaced around its circumference, the recording head being arranged so that one recording element engages one edge of the tape, just before the preceding element disengages the other edge of the tape. The recording is made in a series of straight parallel lines which are not quite at right angles to the line of the tape, due to the longitudinal movement thereof.

To reproduce or play back the recorded matter the tape is traversed in the same way past the same or a similar magnetic head.

The processes of recording upon, and playing back from, magnetic tape are similar, the magnetic head being fed with signals from an amplifier for recording, and delivering signals to an amplifier for reproduction. In what follows the terms "recording," "recording head" etc., will be deemed to include "reproducing," "reproducing head" etc., unless the context otherwise requires.

One object of the invention is to provide a simple and novel method of magnetic recording in which the recording is made in a series of curved paths spaced along the tape.

A further object of the invention is to provide a method of magnetic recording in which the recording is made in a series of curved paths or tracks spaced along the tape and in which the matter recorded on any one of the curved paths may be played back repeatedly while the tape is stationary.

Another object of the invention is to provide magnetic recording apparatus comprising means to move magnetic tape in a straight path, and a magnetic recording head adapted to rotate about an axis set at an angle to the path of said tape, said recording head containing at least one magnetic recording element, said head being so spaced in relation to said tape that said recording element is brought into magnetic recording relation with said tape during each rotation of said recording head, whereby said recording element makes a magnetic recording on a series of curved paths spaced along said tape.

A still further object is to provide magnetic recording apparatus in which magnetic tape is passed over a plane supporting surface, a magnetic head containing a plurality of magnetic recording elements is rotated about an axis perpendicular to the said surface and at such a distance therefrom that the magnetic elements are brought into magnetic recording relationship with said tape, whereby the recording is made on a series of curved tracks spaced along the length of the tape.

Other and further objects of the invention will become apparent from a study of the following description of certain embodiments thereof, having reference to the accompanying drawings. Some of the devices and mechanical movements to be described, while novel in their application, are in themselves based on well-established principles and such portions are shown in simple or even diagrammatic form, to facilitate a ready understanding of the invention, because alternative or more complex methods of achieving the same effects will readily occur to persons properly trained in the art.

Figure 1:
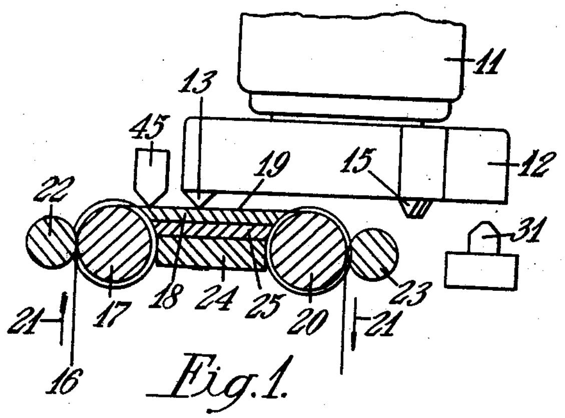
FIGURE 1 is a section on the line I—I of FIGURE 2 and shows in simple diagrammatic form the essential parts of magnetic recording apparatus in accordance with one embodiment of the invention.

Referring to FIGURE 1 the embodiment of the invention comprises a supporting housing 11 containing a shaft (not shown) supported in bearings and adapted to be driven at a controlled speed by suitable motive power means such as an electric motor. The internal design of the housing 11 may be in accordance with that shown in FIGURE 7, to be described hereinafter. Attached to the lower end of the shaft is a rotatable head 12 which will be referred to as a recording head but it is to be understood that the same or a similar head may be employed for playback or reproduction. The recording head 12 is provided at its lower face with three downwardly projecting magnetic elements 13, 14 and 15 which may be recording or reproducing elements or they may be of the kind which fulfils both functions.

Magnetic tape 16 is drawn from a supply spool, which is not shown and may be of the conventional type, over a capstan 17, over a supporting element or tape table 18 having a plane upper surface 19, over a second capstan 20 and thence to a tape take-up spool (not shown), the direction of movement of the tape being indicated by the arrows 21. The capstans 17 and 20 are both provided with flanges by which the tape is located in the transverse direction and they co-operate with pinch rollers, 22 and 23 respectively, which hold the tape in frictional contact with the capstans in the conventional manner. The two pinch rollers 22 and 23 are adapted to be moved sideways away from the associated capstans in order to release the tape, in the conventional manner.

The two capstans are so coupled to driving apparatus as to maintain the tape in a taut condition while passing over the surface 19, for example, the capstan 20 may be driven at a controlled speed to move the tape 16 in the desired direction at a controlled rate and the capstan 17 may be connected to retarding means such as a viscous, eddy current or other brake to maintain the tape over the surface 19 in a taut condition, or the capstan 17 may be driven at a controlled speed and the capstan 20 arranged to maintain a continuous pull on the tape for the same purpose.

Figure 3:
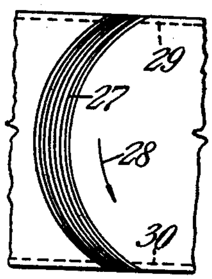
FIGURE 3 shows curved recorded tracks spaced along the tape.

In operation the head 12 is rotated at a desired speed and the capstans are driven in the manner previously described to ensure that the tape is moved at a desired rate over the surface 19 and at the same time maintained in a taut condition. As the head 12 rotates each of the elements 13, 14 and 15 passes over the surface of the tape in an arcuate path thus making a recording on a curved path or track across the tape. Owing to the longitudinal movement of the tape the successive arcs are spaced along the tape as shown in FIGURE 3, the arcs being indicated by reference 27. It will be understood that, although referred to as arcs, the curved tracks 27 are not truly parts of circles but are slightly distorted owing to the longitudinal movement of the tape. The distortion is, however, very small provided that the tape speed is small in relation to the surface speed of the elements.

For reproduction the tape is again passed across the surface 19 while the head 12 is rotated. Since the rotation of the head and the movement of the tape are identical with the movements during recording the magnetic elements follow the curved paths 27 exactly.

The tape table 18 may be supported on a part of the fixed structure 24 and it may be made slightly resilient, for example, it may consist of a portion 25 below the tape table 18, the portion 25 being made of metal and the tape table of a material having some resilience, such as rubber or soft synthetic plastic. Alternatively an intermediate resilient member might be provided and the tape table made of a hard material such as steel having its upper surface 19 polished. The object is to ensure that the surface of the tape is held in contact with the recording elements as the head 12 rotates, while ensuring that the pressure is not sufficient to damage the tape.

Preferably the width of the tape is such that before one recording element disengages the tape at one edge, the following element engages it at the other edge; for example, it might be arranged that when one element, moving in the direction of the arrow 28 reaches the dotted line 30 the next element has already engaged the other edge of the tape and is at the position indicated by the dotted line 29. The leading edges of the elements 13, 14 and 15 are bevelled or rounded to ensure smooth engagement of the elements with the tape surface.

In recording television signals it is necessary to phase the rotation of the recording head 12 with a reference frequency, for example, the supply mains, the line and frame synchronization pulses being recorded with the picture signals on the tape. In playing back it may be required to phase the rotation of the head 12 in such a way that the frame synchronizing pulses of the television signal are phased with the supply mains. In recording other types of signal, it might be required to phase the rotation of the head 12 with other kinds of reference source. The phasing arrangements may be of any known kind.

Figure 2:
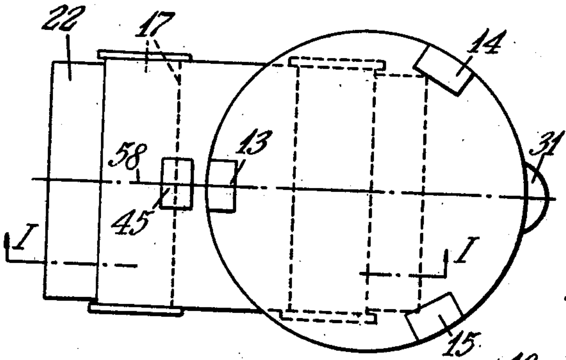
FIGURE 2 is a plan view of the elements of FIGURE 1.

It will be evident that the elements 13, 14 and 15 must be accurately adjusted in the recording head 12. For convenience of illustration they are shown as being accommodated in slots in FIGURES 1 and 2, but more complex arrangements may be employed. The elements 13, 14 and 15 could be mounted on blocks provided with rearwardly directed tongues which engage peripheral slots in the recording head 12 and micrometer screws could be arranged at each side of each block so that the elements may be moved to a limited degree around the head 12 to ensure that the elements are truly spaced at 120°. It is also necessary to ensure that the elements project downwardly to exactly the same extent and for this purpose a permanent gauge block 31 may be provided, the recording head 12 being rotated to bring each element in turn over the gauge block 31 and the height of the element being set by means of a feeler gauge inserted between the block and the element.

Figures 7, 9:
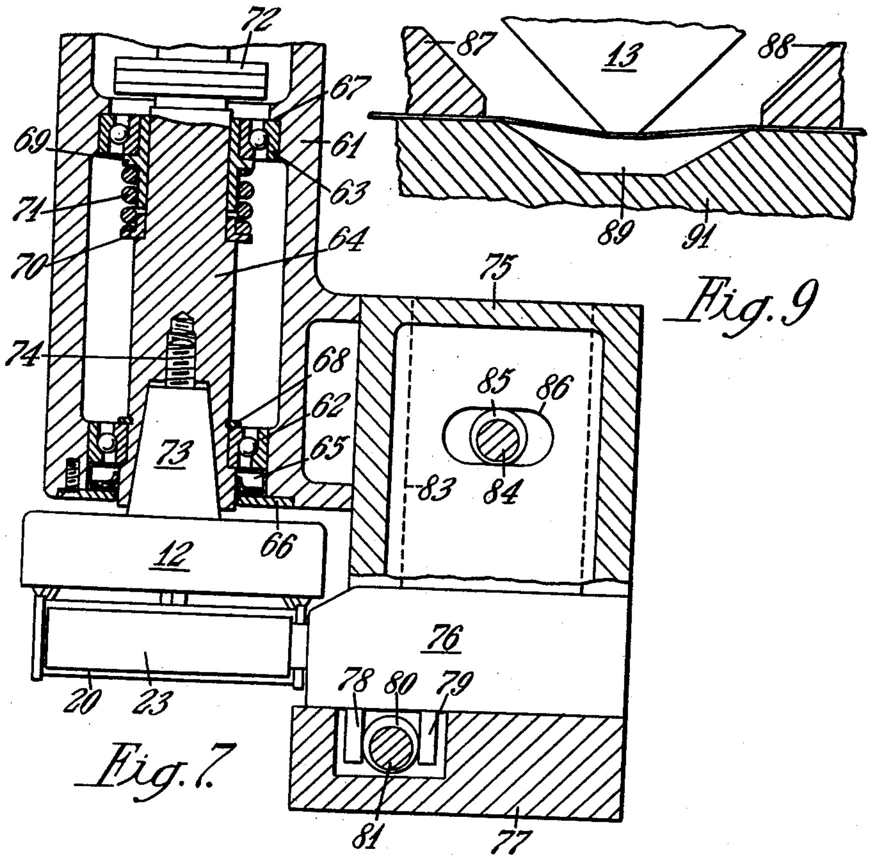
FIGURE 7 shows partly in section a side elevation of the essential parts of a magnetic recording apparatus according to the invention.
FIGURE 9 shows how the tape is pressed slightly into a channel formed in the plane surface by the magnetic head during recording.

In order that the recording elements may ride smoothly over the tape surface during recording and accurately follow the curved tracks during play back or reproduction, it is important that the shaft supporting the recording head should run with a minimum of side play and end play. FIGURE 7 shows a form of construction which provides this feature and also indicates certain improvements to the basic structure of FIGURES 1 and 2.

Referring to FIGURE 7, the housing 61 contains lower and upper bores which accommodate two angular contact ball bearings 62 and 63. The lower bearing 62 is seated on an oil seal 65 which is prevented from moving outwardly by a cover plate 66 secured by screws. The upper bearing 63 bears against an upper shoulder 67 and the bearings are arranged so that the inner race of the bearing 62 will withstand a thrust in the downward direction while the inner race of the bearing 63 will withstand a thrust in the upward direction. The inner race of the bearing 62 is carried on a shaft 64 against a shoulder formed thereon and is retained against axial movement by a circlip 68, while the inner race of the upper bearing 63 is carried on a sleeve 69 which is a close sliding fit on a diameter formed on the upper part of the shaft 64. The sleeve 69 is provided with a shoulder which forms an abutment for one end of a helical compression spring 71 the other end of which bears against an abutment member 70 seated against a shoulder on the shaft 64 at the end of the diameter which accommodates the sleeve 69. The spring is compressed so that it forces the inner races of the bearings 62 and 63 apart. Due to the angular contact provided by the bearings all radial and end plays in the shaft 64 is completely eliminated. The pressure of the spring 71 is carried by the upper bearing 63 while the lower bearing 62 carries the weight of the shaft 74 and the recording head attached to the lower end thereof plus the pressure of the spring 71.

The end of the shaft 64 projects through the cover plate 66 and is formed at its lower end with an internal taper in which a male taper 73 formed on the upper end of the recording head 12 is located, the recording head being retained in position by a single axial bolt 74. At the upper end of the shaft 64 is a coupling 72 by which the shaft may be coupled to an electric driving motor (not shown). It may be preferable to lengthen the shaft 64 by the required amount and build the rotor of the electric motor directly on to the shaft 64, since a direct drive to the recording head 12 is very desirable.

The housing 61 is secured to a hollow column 75 by any convenient means such as flanges and bolts. The tape table 18, the capstans 17 and 20 and the pinch rollers 22 and 23 are carried on shafts supported by a casing 76 which is adapted for horizontal sliding movement from left to right in FIGURE 7 and rests upon a supporting block 77. Provision is, of course, made to couple the capstan shafts to suitable driving means (not shown). The casing 76 and the supporting block 77 are suitably connected by a slide, for example, a slide similar to a machine tool slide, which provides for the horizontal sliding movement referred to but locates the casing 76 in other directions. Projecting downwardly from the casing 76 are two lugs 78 and 79 which are separated by an amount substantially equal to the diameter of an eccentric 80 carried on a spindle 81 supported in the block 77. The spindle 81 is provided with a handle so that it may be rotated through a desired angle and, by virtue of the eccentric 80, causes the sliding housing 76 to move horizontally. The movement of the housing 76 is defined by stops (not shown) and the stops are so arranged that when the housing is moved in one direction to the stop the tape is in the correct position with respect to the recording head 12 for recording and normal playback while if the sliding housing is moved to its other stop the tape is in the correct position for the playing back of single curved tracks with the tape stationary.

It has already been pointed out that the curved tracks or paths produced in recording are not truly parts of a circle. If, however, the rotational axis of the recording head is moved laterally with respect to the tape (which, in FIGURE 7, is achieved by moving the tape) so that the said axis is at the approximate centre of the curved tracks then the elements will follow the tracks almost perfectly with the tape stationary, provided that the tape speed during recording was low in relation to element speed. This enables the invention to be used in a random access computer tape store.

The supporting block 77 has an extension forming a slide 83 arranged on the rear of the column 75 the slide being vertical so that the block 77 may be moved vertically, the movement being controlled by a spindle 84 supported in the extension of the block 77 and carrying an eccentric 85 which engages a slot 86 formed in the column 75. Rotation of the spindle 84 raises or lowers the slide 83 so that the tape table and the capstans and pinch rollers may be raised to bring the tape into magnetic recording relation with the recording head 12 or may be lowered clear of the recording head for rapid traversing movement and loading. The vertical movement of the slide 83 is also limited by stops (not shown).

Figure 8:
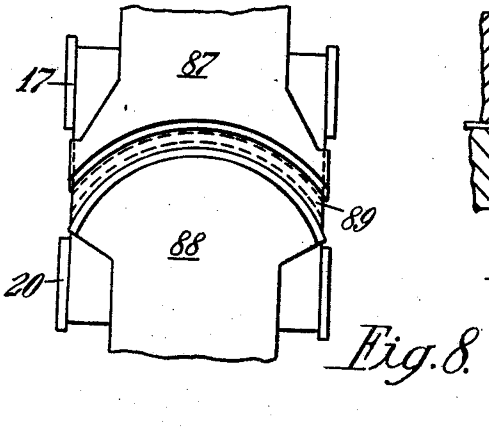
FIGURE 8 is a plan view of a plane surface over which the tape is passed for recording or playback.

In place of the resilient tape table 18 shown in FIGURE 1 a rigid tape table made, for example, from steel having a polished upper surface 19, may be used and an arcuate groove 89 may be formed in the surface as shown in FIGURES 8 and 9, the arcuate groove being disposed below the path of the recording elements 13, 14 and 15. As shown in FIGURE 9, which is a vertical section through the tape table along the centre line of the tape, the recording elements are set down slightly below the upper surface of the tape table so that each recording head presses the taut tape slightly into the groove 89 to ensure a steady and uniform recording pressure on the tape without risk of damage to it.

If desired, two pressure plates 87 and 88 may be arranged in front of and behind the channel 89 to hold the tape flat on the tape table. The pressure plates may be hinged or arranged for sliding movement so that they may be moved clear of the tape when desired and they may be lightly pressed down on to the tape by means of springs (not shown). The actual arrangement may be in any desired form provided that the pressure plates are adapted to press lightly upon the tape to hold it flat on the upper surface of the tape table.

As already mentioned, the recording elements 13, 14 and 15 will have their leading edges rounded or bevelled to ensure a smooth engagement with the surface of the tape, and the pressure plates may be arranged to hold the edge of the tape at which the recording elements engage slightly below the plane of the table in order further to promote smooth engagement. The pressure plates 87 and 88 may be arranged to overlap the edges of he tape table slightly as shown in FIGURE 8 or they may be flush with the edges of the tape table as shown in FIGURE 10.

Figure 10:
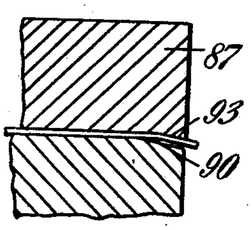
FIGURE 10 shows how the leading edge of the tape may be depressed to facilitate engagement by the magnetic recording elements.

As shown in FIGURE 10, the edge of the tape table is slightly relieved at 90 and the edge of the pressure plate 87 has a slight downward projection 93 to press the edge of the tape slightly below the general plane of the tape. Preferably the relief 90 is rather larger than the downward projection 93 so that a clearance space is left below the edge of the tape.

As an example, the application of the invention to the recording of television signals for a 405-line interlaced system, as used in the United Kingdom, will now be described.

In this description the slight departure of the curved tracks from the truly arcuate form will be ignored.

The system provides 25 frames per second, each frame being made up of two fields consisting of 202½ lines. The field frequency is therefore 50 per second. Each of the arcs 27 is to contain the recording of one complete field and the tracing of each arc must therefore occupy $\frac{1}{50}$ second, so that the speed of the recording head 12 will be $50/3=16\frac{2}{3}$ revolutions per second or 1000 r.p.m.

Figure 4:
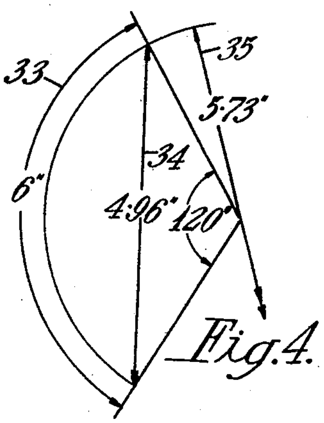
FIGURE 4 is a diagram showing how the width of the tape is related to the length of the arc in a preferred arrangement.

It was previously stated that a recording density of 20,000 cycles per inch is just possible, but for the purpose of the example a recording density of 10,000 cycles per inch will be assumed. To provide high quality reproduction of 405-line pictures, an upper frequency of 3 mc./s. is necessary and at 10,000 cycles per inch the element speed must be $3{,}000{,}000/10{,}000=300$ inches per second. Each of the arcs 27 of FIGURE 3 must therefore have a length of $300/50=6''$. This is shown diagrammatically in FIGURE 4 in which the arc 33 representing the recording of one field has a length of 6″. Since three recording elements are being used, each arc represents 120° of rotation of the head 12. The circumference of the circle traced by the elements is $6\times3=18''$, the diameter 35 of the circle is 5.73″ and the length of the chord 34 is 4.96″. Since the length of the chord is 4.96″ a tape width of 5″ would be sufficient, but this leaves a rather narrow margin at each side and it is preferable either to use a slightly wider tape or a slightly smaller diameter 35, in which case the recording density would be slightly more than 10,000 cycles per inch.

Figure 5:
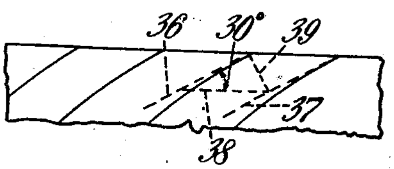
FIGURE 5 is a diagram indicating the spacing of the arcs along the tape.

FIGURE 5 shows an enlarged view of one edge of the tape. The two dotted lines 36 and 37 are tangential to the ends of two of the arcs and since the total angle embraced by each arc is 120° the angle between the line 36 and the line 38, which is parallel to the line of the tape, is 30°. The line 39 is at right angles to the lines 36 and 37 and defines the transverse distance between them. It is convenient to make the lateral spacing (i.e. the length of the line 39) 0.02″ so that the spacing of the arcs along the tape is $0.02/\sin 30°=0.04''$ and this is the distance the tape must move in the longitudinal direction for each recorded arc. Since 50 arcs are recorded per second the tape speed will be $0.04\times50=2$ inches per second.

Figure 6:
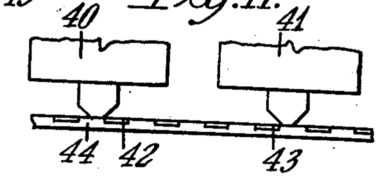
FIGURE 6 shows one method of deriving signals from the tape for the purpose of phasing control.

In playing back the tape, it is necessary to ensure that its movement is correctly phased with the rotation of the recording head 12 to ensure that each element follows a recorded arc and does not wander into the spaces between the arcs. One method of providing correct phasing is shown in FIGURE 6. Two additional magnetic elements 40 and 41 are provided on the head 12 and are so spaced that they are close to opposite edges of two recorded arcuate tracks 42 and 43, represented by small rectangles in the tape 44. If the tape is running correctly the two heads 40 and 41 will run at the respective edges of their tracks and will each produce a weak signal, the signals being of equal magnitude. If the tape begins to run ahead then the element 41 will begin to run on the track 43, thus producing a stronger signal, while the element 40 will be further from the track 42 and will produce a weaker signal. On the other hand, if the tape begins to lag then the element 40 will produce a stronger signal and the element 41 will produce a weaker signal. These differences in signal level are employed to control a servo system which either increases or decreases the speed of the driving capstan very slightly until the correct condition is restored.

Another method of phasing is shown in FIGURE 1. A fixed head 45 is placed behind the head 12 and as the successive tracks pass under it, it produces a series of pulses. The element 31 is now a magnetic pick-up instead of a gauge block, so that each time one of the elements 13, 14 or 15 passes over, a signal is induced in it. The phase of the signal in the pick-up 31 is compared with that produced by the head 45, and when a predetermined relationship is departed from, the servo mechanism is activated.

Figure 11:
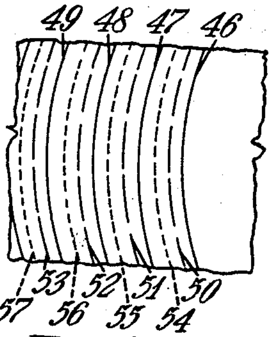
FIGURE 11 shows how a recording may be made with multiple magnetic elements.

It may be required to record two or more signals simultaneously for example, to record a sound signal separately from a vision signal, or several signals for colour television. In that case each element 13, 14 and 15 may be a multiple track element, and it is arranged that the recordings made by the three heads are interlaced, as shown in FIGURE 11.

Assuming that it is desired to record three signals, one of them will be recorded on the tracks 46, 47, 48 and 49, the second on the tracks 50, 51, 52 and 53, and the third on tracks 54, 55, 56 and 57. The tape speed is, of course, increased to treble its former level. It will be understood that the methods of phasing shown are only given by way of example and other methods may be used if desired.

If the axis of rotation of the recording head 12 is on the centre line 56 then, due to the longitudinal movement of the tape, the centres of the arcs will not lie on the centre line 56. In order to make the most economical use of the tape the axis of the head 12 may be offset from the centre line 56, so that the centres of the recorded arcs lie on the centre line 56. On the other hand, it will be understood that the arcs need not lie across the tape as shown and that the axis of the head 12 may be offset to any desired extent from the centre line 56.

I claim:

1. Magnetic recording apparatus comprising magnetic tape, a tape table having a plane surface, means to move said tape at a predetermined rate over said tape table, a magnetic recording head disposed to rotate about an axis perpendicular to said plane surface, a plurality of magnetic recording elements in said recording head equally spaced on a circle centred on said axis, means to move said tape at a predetermined rate over said plane surface while maintaining said tape in a taut condition, means to rotate said recording head in magnetic recording relation with said tape, whereby said recording elements produce magnetic records on said tape on a series of curved paths spaced along said tape, and means for moving said axis transversely relatively to said tape, whereby said elements substantially follow said curved paths while said tape is stationary, and the matter recorded in a selected one of said paths may be reproduced.

2. Apparatus as claimed in claim 1 wherein said tape table is formed with a channel opposite the path of said recording elements and said recording head is so spaced from said plane surface that each recording element makes contact with said tape during rotation of said head and presses said tape slightly into said channel, and comprising means to maintain said tape in a taut condition while passing over said plane surface, whereby a uniform recording pressure is obtained.

3. Apparatus as claimed in claim 1 wherein said magnetic elements are adjustably mounted in said head, and comprising means for adjusting said elements angularly to secure equi-angular spacing and axially to secure rotation of the recording parts of said elements in the same plane.

4. Apparatus as claimed in claim 1 comprising an additional fixed magnetic recording element mounted in co-operative relation with said tape to produce a series of pulses on playing back a previously recorded tape as each curved recorded path passes under it, and comprising also a magnetic pick-up placed close to the path of the magnetic elements to produce a series of pulses in said pick-up as said magnetic elements pass it, whereby the movement of said tape may be controlled by comparing the phase of the two series of pulses and using the result of the comparison to adjust the speed of said tape with respect to the speed of said rotatable head.

5. Apparatus as claimed in claim 1 comprising a magnetic pick-up placed adjacent the path of said recording elements, whereby a pulse is induced in said pick-up as each element passes said pick-up, and said pulses may be used to keep said magnetic head rotating in phase with an external control frequency by comparing the phase of said pulses with said external frequency.

6. Apparatus as claimed in claim 1 comprising pressure plates in front of and behind the path of said element to press said tape into contact with said tape table.

7. Apparatus as claimed in claim 1 wherein said record-head comprises three magnetic elements.

8. Apparatus as claimed in claim 1 comprising a shaft carrying said recording head, a pair of bearings to support said shaft adapted to accept thrust loads acting in opposite directions, the bearing adjacent said recording head being of a type having angular contact, a sliding member on said shaft co-acting with the bearing remote from said recording head, and spring means acting between said shaft and said sliding member to apply thrust loads to both said bearings, whereby radial and end play at the end of said shaft carrying said recording head is eliminated.

9. Apparatus as claimed in claim 8 wherein both bearings are anti-friction bearings of the angular contact type, the bearing adjacent said recording head has its inner race mounted on said shaft and is arranged to accept a thrust load acting towards said tape, comprising a sleeve slidable on said shaft whereon the inner race of the other bearing is mounted, said other bearing being arranged to accept a thrust load acting away from said tape, said spring means acting between said shaft and said sleeve to apply thrust loads to both said bearings.

10. Apparatus as claimed in claim 1 wherein said means to move said tape comprises a pair of capstans each having a co-operating pinch roller, and said means to displace said axis laterally with respect to said tape comprises a casing mounted for movement transverse to the direction of tape movement, said supporting element and said capstans and pinch rollers being mounted on said casing.

11. Apparatus as claimed in claim 10 comprising a slide adapted for movement in a direction parallel to said axis whereon said casing is mounted, whereby said tape may be moved into and out of magnetic recording engagement with said recording head.

References Cited in the file of this patent

UNITED STATES PATENTS

| | | |
|---|---|---|
| 2,326,332 | Clausen | Aug. 10, 1943 |
| 2,750,449 | Thompson | June 12, 1956 |
| 2,803,709 | Lyon | Aug. 20, 1957 |
| 2,919,314 | Holt | Dec. 29, 1959 |
| 2,937,241 | Colbert | May 17, 1960 |
| 2,942,061 | Pfrost | June 21, 1960 |
| 3,020,356 | Barry | Feb. 6, 1962 |